(12) United States Patent
Maruyama

(10) Patent No.: US 8,540,378 B2
(45) Date of Patent: Sep. 24, 2013

(54) PROJECTOR AND CONTROL METHOD OF PROJECTOR

(75) Inventor: Shunji Maruyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 13/032,994

(22) Filed: Feb. 23, 2011

(65) Prior Publication Data

US 2011/0216290 A1     Sep. 8, 2011

(51) Int. Cl.
*G03B 21/14*     (2006.01)

(52) U.S. Cl.
USPC ............. 353/101; 353/79; 353/100; 353/119; 353/122; 349/7; 348/745

(58) Field of Classification Search
USPC ................... 353/101, 100, 69, 70, 79, 30, 31, 353/34, 37, 119, 122; 349/5–9; 352/139–140; 348/745, 806
See application file for complete search history.

(56) References Cited

U.S. PATENT DOCUMENTS

| | | | |
|---|---|---|---|
| 4,944,578 A * | 7/1990 | Denison | 349/6 |
| 6,592,228 B1 * | 7/2003 | Kawashima et al. | 353/101 |
| 6,880,938 B2 * | 4/2005 | Nakano | 353/119 |
| 6,959,991 B2 * | 11/2005 | Ho et al. | 353/119 |
| 7,364,304 B2 * | 4/2008 | Nomizo et al. | 353/30 |
| 2010/0053572 A1 | 3/2010 | Oka et al. | |

FOREIGN PATENT DOCUMENTS

| | | |
|---|---|---|
| CN | 101666959 A | 3/2010 |
| JP | A 2003-295310 | 10/2003 |
| JP | B2 3755479 | 3/2006 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector includes: a lens position control unit which controls a projection position of an image by shifting a projection lens; a signal receiving unit which receives a position control start signal to start position control and a lens shift signal from a remote controller; a direction conversion memory unit which stores direction conversion information corresponding to the lens shift signal as information for performing a predetermined conversion of the shift direction of the projection lens; a shift direction converting unit which converts the shift direction of the projection lens based on the direction conversion information; a menu display unit which displays a direction conversion menu screen through which the direction conversion information is inputted; and a control unit which allows the menu display unit to display the direction conversion menu screen when a predetermined condition is satisfied at the time of reception of the position control start signal.

12 Claims, 8 Drawing Sheets

PROJECTOR AND CONTROL METHOD OF PROJECTOR

CROSS-REFERENCE

The present application claims priority from Japanese Patent Application No. 2010-044998 filed on Mar. 2, 2010, which is hereby incorporated by reference in its entirety.

BACKGROUND

A projector has been used in various fields such as companies, event sites, schools, and homes. The projector used in these fields is placed on a desk or the like for projection onto a screen (hereinafter referred to as normal position), or suspended from a high position such as a ceiling and fixed thereto by using a fixing jig with the position of the projector set upside down for projection (hereinafter referred to as suspended position).

A type of projector has a lens shift (lens position control) function which controls the projection position of an image by shifting a projection lens. This lens shift, function can be executed by using a remote controller attached to the projector.

When the installation position of the projector having the lens shift function is changed from the normal position to the suspended position, the pressing direction of a button associated with the lens shift function and operated by the remote controller does not agree with the shifting direction of the projection lens (that is, the button and the projection lens shift in opposite directions). For overcoming this problem, such a projector which provides a direction setting menu screen for reversing the pressing direction of the button operated by the remote controller has been proposed.

In addition, Japanese Patent Publication No. 2003-295310 discloses an image projection apparatus (projector) which matches the direction of key input operation by an operator and the increasing and decreasing direction on the screen when the direction of a menu within a projection image and the increasing and decreasing direction of the key operation become opposite to each other in the left-right direction for the sense of operation of the operator under the condition in which the image projection apparatus is placed upside down.

According to the image projection apparatus disclosed in Japanese Patent Publication No. 2003-295310, a sensor or the like for detecting whether the installation position is in the upside-down condition or not is needed, which leads to cost increase.

There is a method which requires a user to display a direction setting menu screen and input setting through the menu screen for reversing the pressing direction of the button on the remote controller without using the sensor or the like. According to this method, however, a user needs to open a menu screen of the projector, press various buttons, and search for the direction setting menu screen contained in the menu screen for displaying the desired direction setting menu screen. This necessity lowers the maneuverability of the projector for the user.

SUMMARY

Various embodiments may provide a technology capable of solving at least a part of the problems described above, and the invention can be implemented as the following forms or application examples.

Application Example 1

According to at least one embodiment of the disclosure, there is provided a projector controllable by remote operation using a remote controller that includes: a lens position control unit which controls a projection position of an image by shifting a projection lens; a signal receiving unit which receives a position control start signal for allowing the lens position control unit to start position control and a lens shift signal for specifying a shift direction and shifting the projection lens in the specified shift direction from the remote controller; a direction conversion memory unit which stores direction conversion information corresponding to the lens shift signal received by the signal receiving unit as information for performing a predetermined conversion of the shift direction of the projection lens; a shift direction converting unit which converts the shift direction of the projection lens based on the direction conversion information stored in the direction conversion memory unit; a menu display unit which displays a direction conversion menu screen through which the direction conversion information is inputted; and a control unit which allows the menu display unit to display the direction conversion menu screen when a predetermined condition is satisfied at the time of reception of the position control start signal by the signal receiving unit.

According to this projector, the lens position control unit controls the projection position of the image by shifting the projection lens. The signal receiving unit receives the position control start signal and the lens shift signal from the remote controller. The direction conversion memory unit stores the direction conversion information corresponding to the lens shift signal as information for performing the predetermined conversion of the shift direction of the projection lens. The shift direction converting unit converts the shift direction of the projection lens based on the direction conversion information. The menu display unit displays the direction conversion menu screen. The control unit allows display of the direction conversion menu screen when the predetermined condition is satisfied at the time of reception of the position control start signal. According to this structure, the direction conversion menu screen is displayed when the predetermined condition is satisfied at the time of reception of the position control start signal. Thus, a user can set conversion of the shift direction of the projection lens through the direction conversion menu screen. Moreover, disagreement between the direction of the lens shift signal received from the remote controller and the shift direction of the projection lens can be avoided. In addition, since the direction conversion menu screen is displayed without requiring intention of display by the user, the maneuverability can improve.

Application Example 2

According to the projector of the above application example, wherein the direction conversion information stored in the direction conversion memory unit for performing the predetermined conversion is information indicating whether the shift direction of the projection lens is reversed or not.

According to this projector, the direction conversion information indicates whether the shift direction of the projection lens is reversed or not. In this case, disagreement between the direction of the lens shift signal received from the remote controller and the shift direction of the projection lens can be avoided under the normal position in which the projector main body is placed in the predetermined standard position or under the suspended position in which the projector main body is placed upside down at the time of lens position control.

Application Example 3

According to the projector of the above application example, further including an installation position memory unit which stores either a normal position corresponding to a condition that the projector main body is placed in a predetermined standard position or a suspended position corresponding to a condition that the projector main body is placed upside down as installation position information of the projector main body. In this case, the predetermined condition is a condition in which the current installation position information currently stored in the installation position memory unit is different from the previous installation position information stored in the installation position memory unit at the time of previous reception of the position control start signal.

According to this projector, the installation position memory unit stores either the normal position or the suspended position as the installation position information. When the predetermined condition at the time of reception of the position control start signal is the condition in which the current installation position information is different from the previous installation position information obtained at the time of previous reception of the position control start signal, the direction conversion menu screen is displayed. That is, when the current installation position information is changed from the previous installation position information at the time of reception of the position control start signal, the direction conversion menu screen for avoiding disagreement of the shift direction of the projection lens for the lens position control is displayed. According to this structure, the direction conversion menu screen is displayed without requiring intention of display by the user, which improves the maneuverability. When the installation position information is not changed, the direction conversion menu screen is not displayed. Thus, the lens position control can be easily carried out.

Application Example 4

According to the projector of the above application example, further including an installation position memory unit which stores either a normal position corresponding to a condition that the projector main body is placed in a predetermined standard position or a suspended position corresponding to a condition that the projector main body is placed upside down as installation position information of the projector main body. In this case, the predetermined condition corresponds to a setting in which the installation position information stored in the installation position memory unit is set at the normal position with the direction conversion information of the direction conversion memory unit set at reverse, or a setting in which the installation position information stored in the installation position memory unit is set at the suspended position with the direction conversion information of the direction conversion memory unit set at non-reverse.

According to this projector, the installation position memory unit stores either the normal position or the suspended position as the installation position information. The predetermined condition corresponds to the setting in which the installation position information is set at the normal position with the direction conversion information of the direction conversion memory unit set at reverse, or the setting in which the installation position information is set at the suspended position with the direction conversion information of the direction conversion memory unit set at non-reverse. According to this structure, the direction conversion menu screen for avoiding disagreement of the shift direction of the projection lens for the lens position control is displayed when the predetermined condition is satisfied at the time of reception of the position control start signal. In this case, the direction conversion menu screen is displayed without requiring intention of display by the user, which improves the maneuverability. When the predetermined condition is not satisfied, the direction conversion menu screen is not displayed. Thus, the lens position control can be easily carried out.

Application Example 5

According to at least one embodiment of the disclosure, there is provided a control method of a projector that is controllable by remote operation using a remote controller and includes a lens position control unit which controls a projection position of an image by shifting a projection lens, a signal receiving unit which receives a position control start signal for allowing the lens position control unit to start position control from the remote controller, and a lens shift signal for specifying a shift direction and shifting the projection lens in the specified shift direction, a direction conversion memory unit which stores direction conversion information corresponding to the lens shift signal received by the signal receiving unit as information for performing a predetermined conversion of the shift direction of the projection lens, a shift direction converting unit which converts the shift direction of the projection lens based on the direction conversion information stored in the direction conversion memory unit, and a menu display unit which displays a direction conversion menu screen through which the direction conversion information is inputted. The control method of the projector includes: allowing the signal receiving unit to receive the position control start signal from the remote controller; determining whether a predetermined condition is satisfied when the position control start signal is received; and allowing the menu display unit to display the direction conversion menu screen when it is determined that the predetermined condition is satisfied.

According to this control method of the projector, the direction conversion menu screen is displayed when the predetermined condition is satisfied at the time of reception of the position control start signal. Thus, the user can set conversion of the shift direction of the projection lens through the direction conversion menu screen. Moreover, in the lens position control, disagreement between the direction of the lens shift signal received from the remote controller and the shift direction of the projection lens can be avoided. Furthermore, the direction conversion menu screen is displayed without requiring intention of display by the user. Thus, the maneuverability can improve.

When the projector and the control method of the projector use a computer equipped on the projector, the above application examples of the invention can be structured in the form of a program for providing the functions contained in the above application examples of the invention, or a recording medium or the like which records the program in a manner readable by the computer. The recording medium may be a flexible disk or a hard disk, a CD-ROM (compact disk read only memory), a DVD (digital versatile disk), a photo-electromagnetic disk, a non-volatile memory card, an internal memory unit of the projector (semiconductor memory such as RAM (random access memory) and ROM (read only memory)), an external memory unit (such as USB (universal serial bus) memory), or other various types of media readable by the computer.

BRIEF DESCRIPTION OF THE DRAWINGS

Non-limiting and non-exhaustive embodiments of the present disclosure will be described with reference to the accompanying drawings, wherein like numbers reference like elements.

FIGS. 1A and 1B are perspective views of a projector according to a first embodiment, wherein: FIG. 1A shows a front surface and an upper surface of a device main body; and FIG. 1B shows a rear surface and a bottom surface of the device main body.

DESCRIPTION OF EMBODIMENTS

Embodiments are hereinafter described with reference to the accompanying drawings.
First Embodiment A projector according to a first embodiment is now explained. The projector in this embodiment displays a direction setting menu screen for reversing the direction of lens shift executed by using a remote controller in response to the change of the installation position (setting mode) of the projector.

Figure 1A:
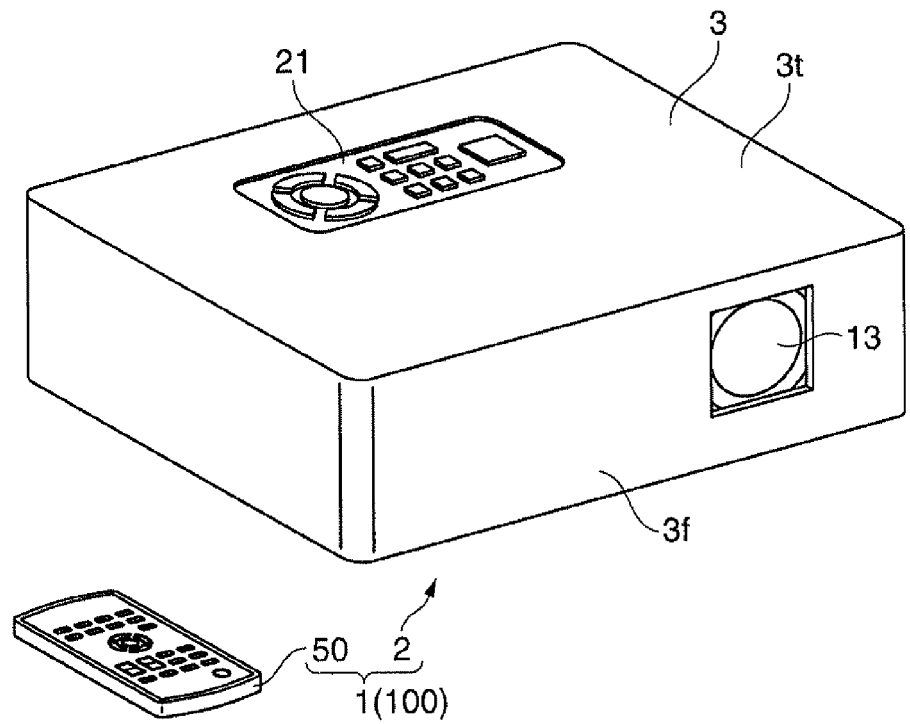
Figure 1B:
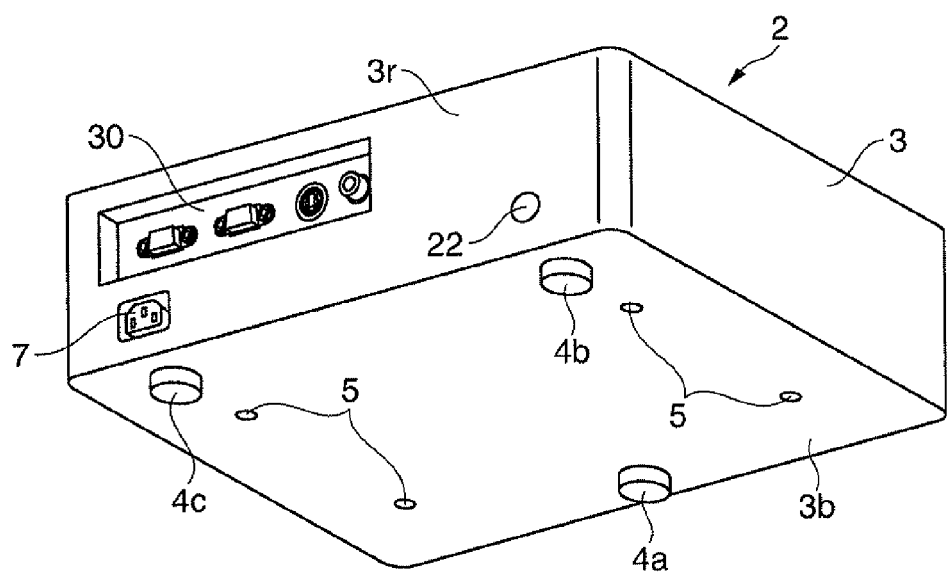
Figure 2:
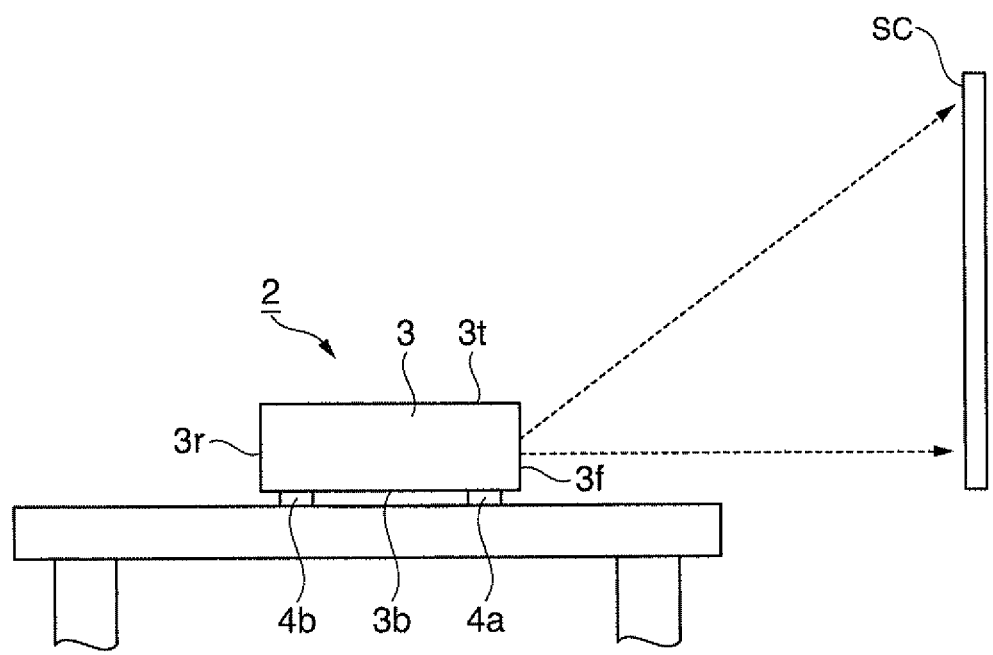
FIG. 2 is a side view illustrating a condition in which the projector projects an image with the projector main body placed on a desk or the like (normal position).
Figure 3:
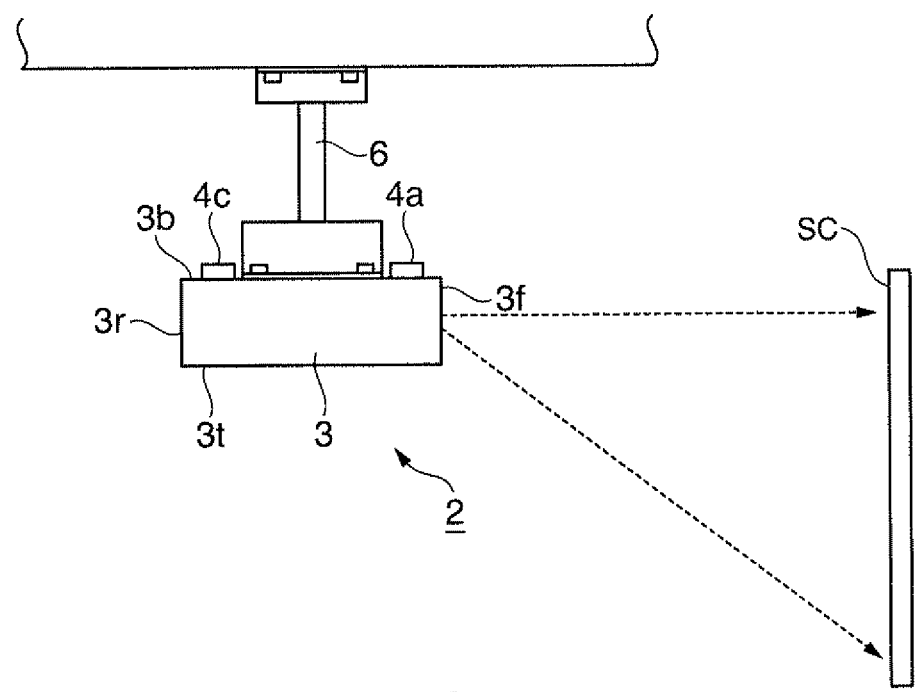
FIG. 3 is a side view illustrating a condition in which the projector projects an image with the projector main body fixed to a ceiling or the like (suspended position).

FIGS. 1A and 1B are perspective views of the projector according to the first embodiment. FIG. 1A illustrates the front surface and the upper surface of an apparatus main body, and FIG. 1B illustrates the rear surface and the bottom surface of the apparatus main body. FIGS. 2 and 3 are side views illustrating the projector projecting an image. FIG. 2 shows a condition of the apparatus main body placed on a desk or the like (normal position), and FIG. 3 shows a condition of the apparatus main body fixed to a ceiling or the like (suspended position).

As illustrated in FIGS. 1A and 1B, a projector 1 includes an apparatus main body (a projector main body 2) and a remote controller 50 equipped for remote control of the projector main body 2. The projector main body 2 has a housing 3 in which the projector body 2 is accommodated. As illustrated in FIG. 1A, a projection lens 13 is exposed through a front surface 3f of the housing 3 to project an image (image light) onto an external screen or the like. According to this embodiment, the projector 1 contains a lens shift mechanism (not shown in FIGS. 1A and 1B) which shifts the projection lens 13 to control the projection position of the image. An upper surface 3t of the housing 3 has an operation receiving unit 21 which receives input operation from a user.

As illustrated in FIG. 1B, a bottom surface 3b of the housing 3 has a front foot 4a approximately at the center on the front part, and rear feet 4b and 4c on the right and left on the rear part. When the projector main body 2 is placed on a desk or the like in the standard position in which the upper surface 3t of the housing 3 faces above, the projector main body 2 is supported by the three feet (the front foot 4a and the rear feet 4b and 4c) (see FIG. 2). The bottom surface 3b of the housing 3 further has four screw holes 5 to which a suspension fitting 6 (see FIG. 3) used when the projector main body 2 is fixed to a ceiling or the like is attached. The projector main body 2 is fixed to a ceiling or the like in the upside-down position of the housing 3 (suspended position) by using the suspension fitting 6 (see FIG. 3).

A rear surface 3r of the housing 3 has an image signal input unit 30 including a plurality of input terminals through which image signals and the like are inputted, and a power source terminal 7 through which commercial power supply is inputted. The rear surface 3r further has a signal receiving unit 22 which receives operation signals transmitted from the remote controller 50.

Figure 4:
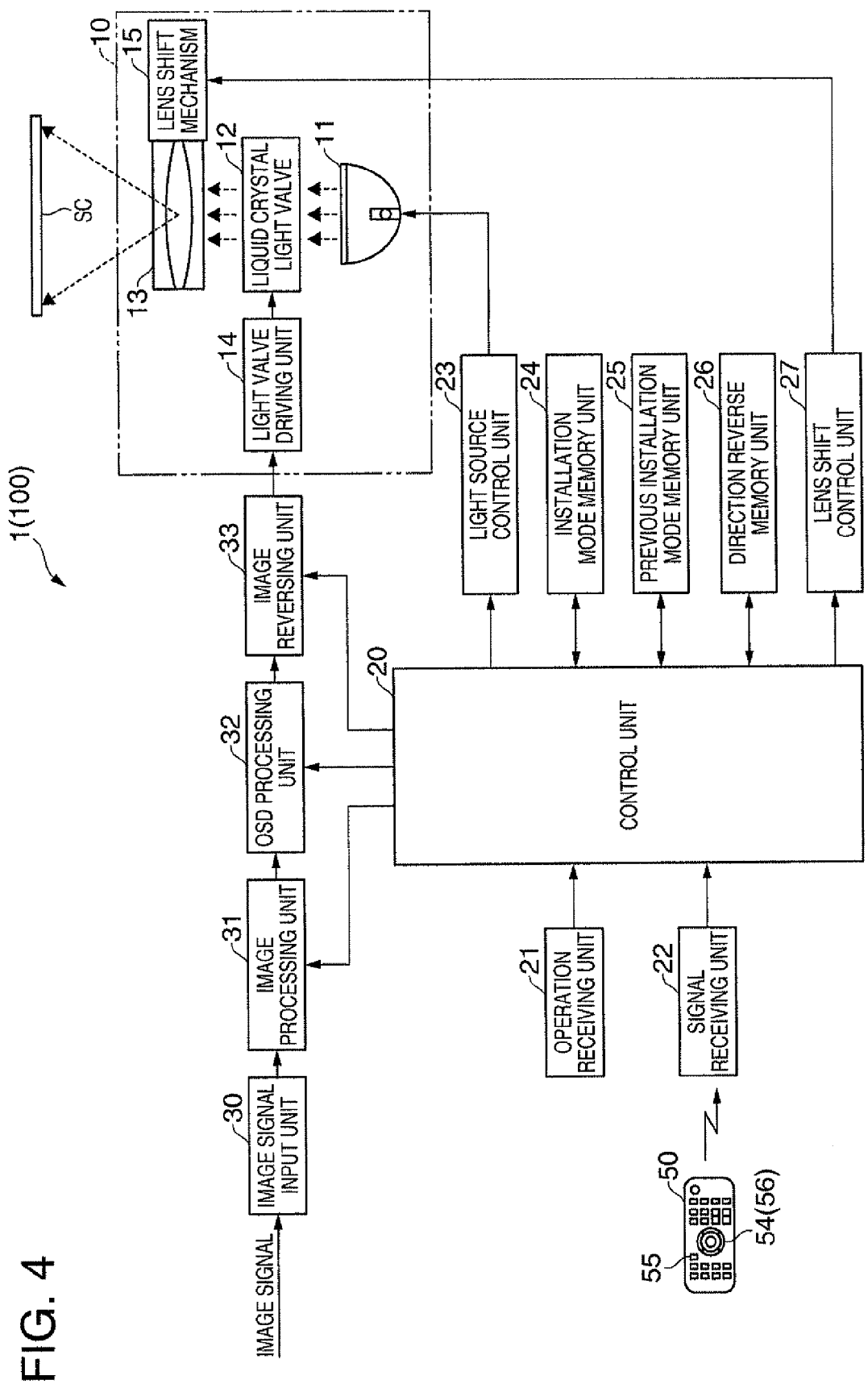
FIG. 4 is a block diagram showing the general structure of the projector.

The internal structure of the projector 1 is now explained. FIG. 4 is a block diagram showing the general structure of the projector 1 according to this embodiment. The internal structure of the projector 1 is herein discussed with reference to FIG. 4.

The projector 1 includes an image projecting unit 10, a control unit 20, the operation receiving unit 21, the signal receiving unit 22, a light source control unit 23, an installation mode memory unit 24 as an installation position memory unit, a previous installation mode memory unit 25, a direction reverse memory unit 26 as a direction conversion memory unit, a lens shift control unit 27, the image signal input unit 30, an image processing unit 31, an OSD processing unit 32, an image reversing unit 33, the remote controller 50 and others.

The image projecting unit 10 contains a light source 11 constituted by a discharge-type light source such as an extra-high pressure mercury lamp and a metal halide lamp, or by a solid light source such as an LED (light emitting diode) and a laser, a liquid crystal light valve 12 as a light modulation device, the projection lens 13, a light valve driving unit 14 for driving the liquid crystal light valve 12, and a lens shift mechanism 15.

The liquid crystal light valve 12 includes a transmission type liquid crystal panel having a pair of transparent substrates between which liquid crystals are sealed, and other components. When driving voltage corresponding to an image signal is applied to respective pixels of the liquid crystal light valve 12 by the operation of the light valve driving unit 14, the respective pixels allow transmission of light emitted from the light source 11 at the transmission rates corresponding to the image signal.

The light emitted from the light source 11 is modulated while passing through the liquid crystal light valve 12. The modulated light is projected through the projection lens 13 to be displayed on a screen SC or the like as an image corresponding to the image signal.

The lens shift mechanism 15 has a motor for shifting the projection lens 13, a gear and others. The lens shift mechanism 15 shifts the projection lens 13 under the control of the lens shift control unit 27 to change the projection position of the projection image.

The control unit 20 contains a CPU (central processing unit), a RAM for temporary memory of various data and for other purposes, and a non-volatile memory such as a mask ROM, a flash memory, and an FeRAM (ferroelectric RAM: ferroelectric memory) (none of these shown) to function as a computer. The control unit 20 supervises and controls the operation of the projector 1 by using the CPU operating under a control program stored in the non-volatile memory.

The operation receiving unit 21 has a plurality of keys operated for issuing various commands to the projector 1, and others. The keys provided on the operation receiving unit 21 involve a "power source key" for turning on and off the power source, an "input selector key" for switching inputted image signals, a "menu key" for switching between display and non-display of a menu screen through which various settings are inputted, a "cursor key" for shifting a cursor on the menu screen or for other operations of the cursor, a "decision key" for deciding various settings, and other keys. When operated by the user, the operation receiving unit 21 outputs control information corresponding to the operation by the user to the control unit 20.

Figure 5:
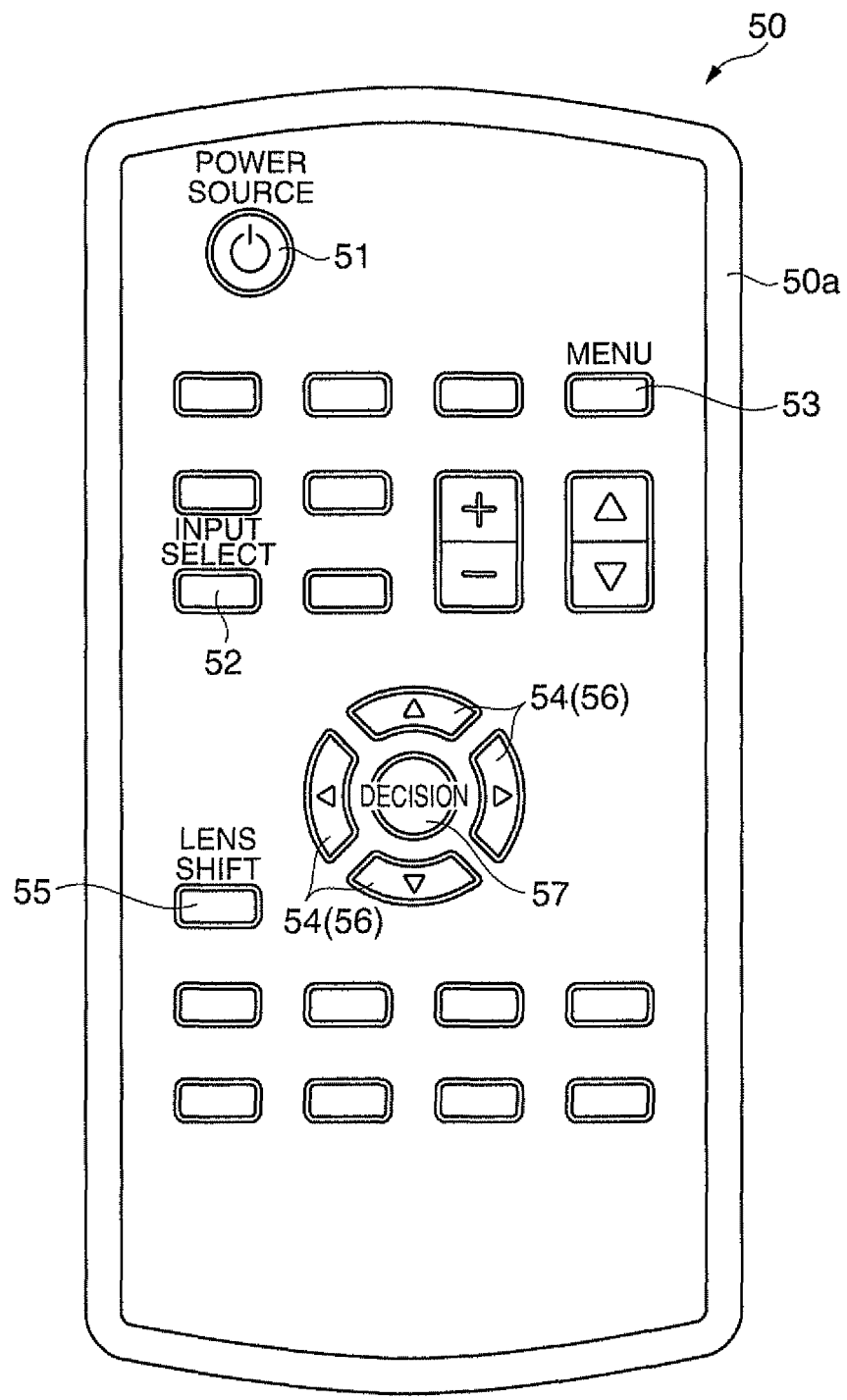
FIG. 5 is a plan view of a remote controller.

The remote controller 50 transmits operation signals formed by infrared light or the like and corresponding to the operation by the user to give various commands to the projector main body 2. FIG. 5 is a plan view of the remote controller 50.

As illustrated in FIG. 5, the remote controller 50 has a housing 50*a* in which the remote controller 50 is accommodated, and has a plurality of keys on the surface of the housing 50*a*. The keys provided on the remote controller 50 involve a "power source key 51" for turning on and off of the power source, an "input selector key 52" for switching inputted image signals, a "menu key 53" for switching between display and non-display of the menu screen through which various settings are inputted, a "cursor key 54" for shifting the cursor on the menu screen or for other operations of the cursor, a "lens shift start key 55" for starting the lens shift function, a "lens shift key 56" for shifting the projection lens 13 by the lens shift function, a "decision key 57" for deciding various settings, and other keys. In this embodiment, the cursor key 54 functions as the lens shift key 56 as well. The lens shift key 56 has an "upward key" for upward shift, a "downward key" for downward shift, a "rightward key" for rightward shift, and a "leftward key" for leftward shift. The operation signals transmitted from the remote controller 50 are received by the signal receiving unit 22 of the projector main body 2.

Returning to FIG. 4, the signal receiving unit 22 has an infrared light receiving module and the like to receive operation signals transmitted from the remote controller 50 and output the received operation signals to the control unit 20 as control information.

The light source control unit 23 controls supply and stop of power given to the light source 11 based on instructions from the control unit 20 to switch between on and off of the light source 11.

The installation mode memory unit 24 having a non-volatile memory stores the installation position information of the projector main body 2 as an installation mode. In this case, either the "normal position" in which the projector 1 is placed in the standard position (see FIG. 2) or the "suspended position" in which the projector 1 is placed upside down (see FIG. 3) is stored as the installation mode. The processes of writing to and reading from the installation mode memory unit 24 are executed by the control unit 20. The control unit 20 issues an instruction for reversing image data to the image reversing unit 33 in accordance with the installation mode stored in the installation mode memory unit 24.

Figure 6:
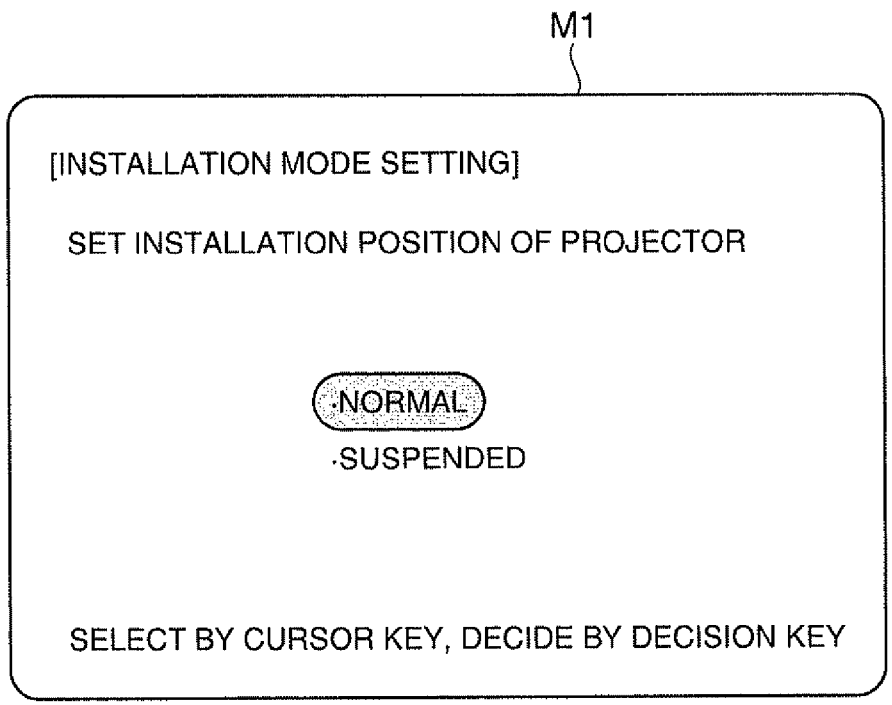
FIG. 6 illustrates an installation mode setting menu screen.

It is assumed herein that the installation mode is set by the user through the menu screen by operation of the operation receiving unit 21. FIG. 6 illustrates an installation mode setting menu screen.

An installation mode setting menu screen M1 is a menu screen through which the user sets the installation mode of the projector main body 2. According to this embodiment, the installation mode setting menu screen M1 is an OSD (on screen display) displayed in response to an instruction given from the control unit 20 to the OSD processing unit 32 described later.

As illustrated in FIG. 6, a character string "INSTALLATION MODE SETTING" which indicates that the menu screen is the installation mode setting menu screen is displayed on the uppermost part of the installation mode setting menu screen M1. Also, a character string "SET INSTALLATION POSITION OF PROJECTOR" which requires setting of the installation mode is displayed below the uppermost part. Furthermore, choices of "NORMAL" and "SUSPENDED" are shown at the center of the screen, and the explanation about the key input procedures is shown on the lower part of the screen.

When the user operates the operation receiving unit 21 or the remote controller 50 to select the "normal" choice or the "suspended" choice on the screen and then determines the selection by the decision key, the control unit 20 writes the selected installation mode to the installation mode memory unit 24 to store the mode therein. In this embodiment, default of the installation mode is determined as the "normal" choice.

Returning to FIG. 4, the previous installation mode memory unit 25 having a non-volatile memory stores the installation mode written to the installation mode memory unit 24 when the lens shift start key 55 is pressed. When the lens shift start key 55 is pressed next time, the control unit 20 compares the previous installation mode memory unit 25 and the installation mode memory unit 24 and determines whether the installation mode is changed. The processes of writing to and reading from the previous installation mode memory unit 25 are executed by the control unit 20.

The direction reverse memory unit 26 having a non-volatile memory stores direction reverse information as direction conversion information. The direction reverse information indicates whether the shift direction of an operation signal received from the remote controller 50 as an operation signal associated with the lens shift key 56 is reversed or not. The processes of writing to and reading from the direction reverse memory unit 26 are executed by the control unit 20. The control unit 20 converts the shift direction of the projection lens 13 based on the direction reverse information stored in the direction reverse memory unit 26, and issues an instruction of lens shift to the lens shift control unit 27. More specifically, when the direction reverse information indicates "reverse", the shift direction of the projection lens 13 is changed to "downward" when the shift direction of the operation signal of the lens shift key 56 is "upward", and changed to "upward" when the shift direction of the operation signal of the lens shift key 56 is "downward". Also, the shift direction of the projection lens 13 is changed to "leftward" when the shift direction of the operation signal of the lens shift key 56 is "rightward", and changed to "rightward" when the shift direction of the operation signal of the lens shift key 56 is "leftward". When the direction reverse information indicates "non-reverse", the shift direction is not reversed.

Figure 7:
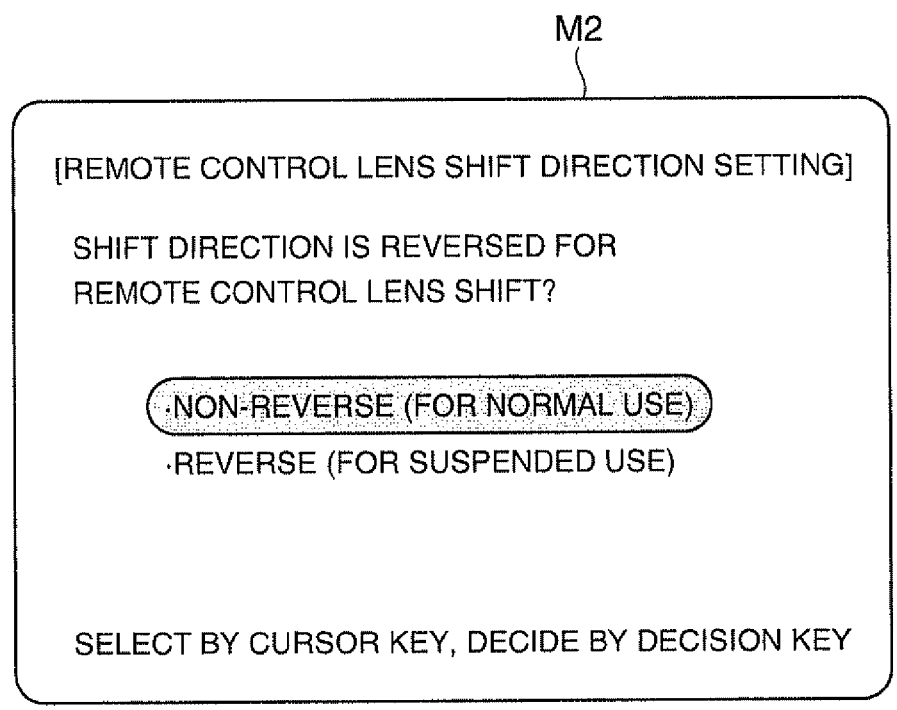
FIG. 7 illustrates a remote control lens shift direction setting menu screen.

It is assumed herein that the direction reverse information is set by the user through the menu screen by operation of the operation receiving unit 21. FIG. 7 illustrates a remote control lens shift direction setting menu screen.

A remote control lens shift direction setting menu screen M2 is a menu screen through which the user sets the direction reverse information. In this embodiment, the remote control lens shift direction setting menu screen M2 is an OSD screen displayed in response to an instruction issued from the control unit 20 to the OSD processing unit 32. In this case, the remote control lens shift direction setting menu screen M2 corresponds to a direction conversion menu screen, and the OSD processing unit 32 corresponds to a menu display unit.

As illustrated in FIG. 7, a character string "REMOTE CONTROL LENS SHIFT DIRECTION SETTING" which indicates that the menu screen is the remote control lens shift direction setting menu screen is displayed on the uppermost part of the remote control lens shift direction setting menu screen M2. Also, a character string "SHIFT DIRECTION IS REVERSED FOR REMOTE CONTROL LENS SHIFT?" which requires setting of the direction reverse information is displayed below the uppermost part. Furthermore, choices of "NON-REVERSE (FOR NORMAL)" and "REVERSE (FOR SUSPENDED)" are shown at the center of the screen, and the explanation about the key input procedures is shown on the lower part of the screen.

When the user selects the "NON-REVERSE (FOR NORMAL)" or the "REVERSE (FOR SUSPENDED)" on the screen by operating the operation receiving unit 21 or the remote controller 50 and determines the selection by the decision key, the control unit 20 writes the selected direction reverse information to the direction reverse memory unit 26 to store the information therein. In this embodiment, default of the direction reverse information is determined as the "non-reverse (for normal)" choice.

Returning to FIG. 4, the lens shift control unit 27 issues an instruction associated with the shift direction and shift amount of the projection lens 13 at the time of operation of the lens shift to the lens shift mechanism 15 in response to an instruction received from the control unit 20. In this embodiment, the lens shift control unit 27 and the lens shift mechanism 15 correspond to a lens position control unit.

The image signal input unit 30 has various types of image input terminals for connection with external image supply devices (not shown) such as a personal computer, a video reproduction device, a memory card, a USE storage, and a digital camera via a cable, and receives image signals from the image supply devices. The image signal input unit 30 coverts the received image signals into image data in the form processible by the image processing unit 31, and outputs the image data to the image processing unit 31.

The image processing unit 31 controls brightness, contrast, sharpness, tint and other conditions of the image data received from the image signal input unit 30, and performs various image quality adjustments such as gamma correction for the received image data in response to an instruction issued from the control unit 20. The image processing unit 31 outputs the image data obtained after these controls and processes to the OSD processing unit 32.

The OSD processing unit 32 superimposes an OSD image such as a menu screen and a message screen on the image data received from the image processing unit 31 in response to an instruction issued from the control unit 20. The OSD processing unit 32 has a not-shown OSD memory to store OSD image data indicating figures, fonts and the like used for forming an OSD image. When the control unit 20 issues an instruction for superimposing an OSD image, the OSD processing unit 32 reads necessary OSD image data from the OSD memory and combines the OSD image data with the image data received from the image processing unit 31 such that the OSD image can be superimposed on a predetermined position of an input image. The image data combined with the OSD image data is outputted to the image reversing unit 33. When the instruction for superimposing an OSD image is not issued from the control unit 20, the OSD processing unit 32 outputs the image data received from the image processing unit 31 to the image reversing unit 33 without change.

The image reversing unit 33 rotates the image data received from the image processing unit 31 by 180 degrees in response to an instruction issued from the control unit 20. In this embodiment, the "rotation by 180 degrees" is referred to as "reverse". When the installation mode stored in the installation mode memory unit 24 is set at "suspended position", the control unit 20 issues an instruction for reversing the image data to the image reversing unit 33. When the installation mode is set at "normal position", the control unit 20 issues an instruction for prohibiting reverse of the image data to the image reversing unit 33. When the image data is reversed by the image processing unit 31 in the suspended position of the projector main body 2, the image projected on the screen SC is displayed in the normal condition in the up-down direction and in the left-right direction. The image data reversed by the image reversing unit 33 is outputted to the light valve driving unit 14. When the instruction for reversing the image data is not issued from the control unit 20, the image reversing unit 33 outputs the image data received from the OSD processing unit 32 to the light valve driving unit 14 without change.

When the light valve driving unit 14 drives the liquid crystal light valve 12 in accordance with the image data received from the image reversing unit 33, the liquid crystal light valve 12 modulates light received from the light source 11 into image light corresponding to the image data and projects the image light through the projection lens 13.

The process performed when the projector main body 2 receives a lens shift start signal as a position control start signal from the remote controller 50 is now explained. The lens shift start signal herein refers to an operation signal transmitted when the lens shift start key 55 provided on the remote controller 50 is pressed.

Figure 8:
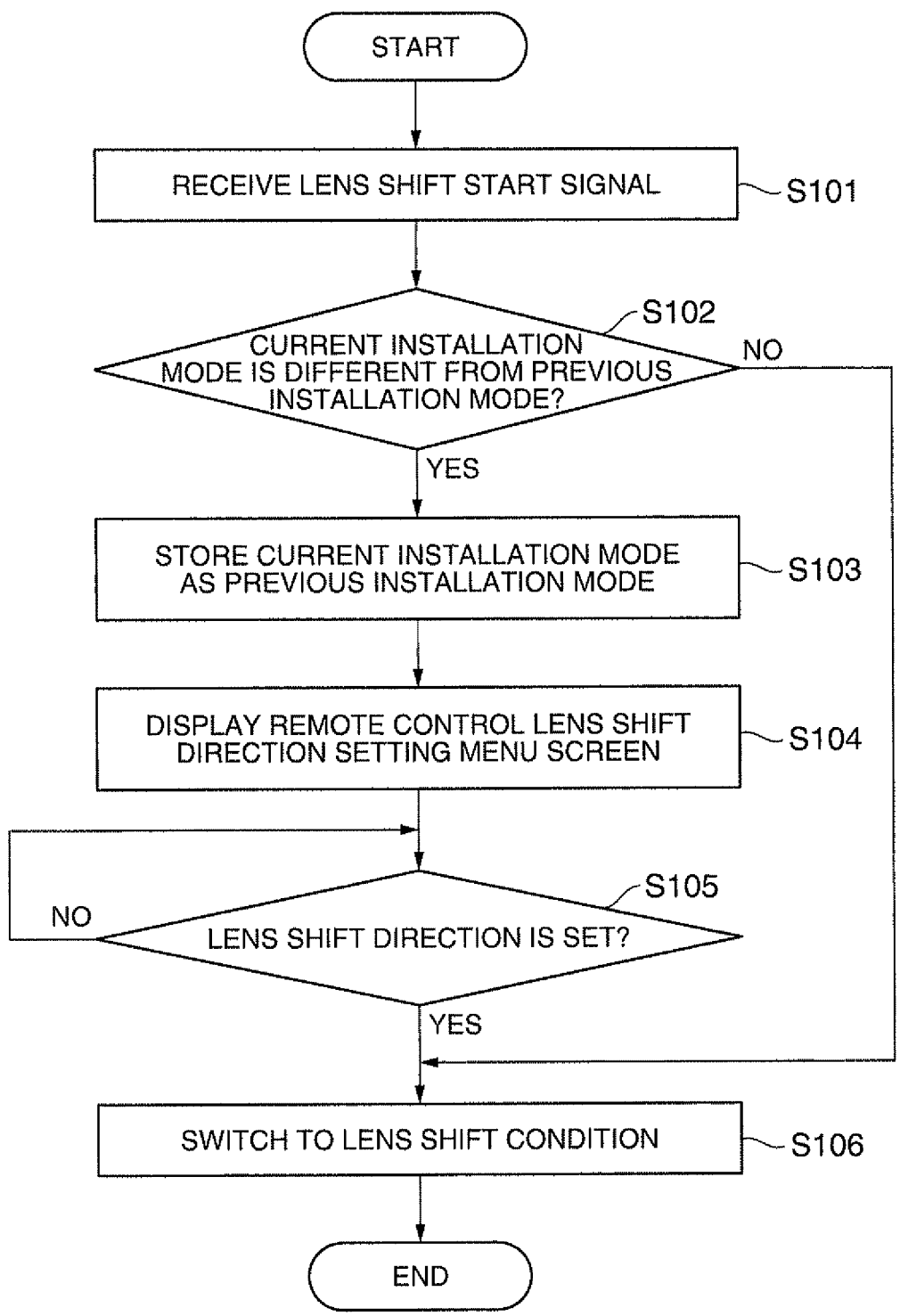
FIG. 8 is a flowchart showing the process performed when the projector receives a lens shift start signal.

FIG. 8 is a flowchart showing the process executed when the projector 1 receives the lens shift start signal.

When receiving the lens shift start signal from the remote controller 50 (step S101), the control unit 20 compares the current installation mode stored in the installation mode memory unit 24 and the previous installation mode stored in the previous installation mode memory unit 25 to determine whether these modes are different (step S102).

When the current installation mode is different from the previous installation mode (step S102: YES), the control unit 20 allows the previous installation mode memory unit 25 to store the setting of the current installation mode (step S103). Then, the control unit 20 issues an instruction for displaying the remote control lens shift direction setting menu screen M2 to the OSD processing unit 32 (step S104). The control unit 20 waits for the setting of the lens shift direction to be inputted by the user while displaying the remote control lens shift direction setting menu screen M2 (step S105). When the setting of the lens shift direction is completed, the control unit 20 stores the setting in the direction reverse memory unit 26 as direction reverse information.

When the setting of the lens shift direction is finished (step S105: YES), the control unit 20 allows the projector 1 to come into the lens shift condition in which the projector 1 can receive the operation of the lens shift key 56 and shift the projection lens 13 (step S106). Then, the process performed when the projector 1 receives the lens shift start signal ends.

When the current installation mode agrees with the previous installation mode (step S102: NO), the flow proceeds to the step S106 and allows the projector 1 to come into the lens shift condition. Then, the process performed when the projector 1 receives the lens shift start signal ends.

Accordingly, when the current installation mode is different from the previous installation mode, the projector 1 displays the remote control lens shift direction setting menu screen M2 and allows the user to change the direction reverse information of the lens shift.

The process performed when the projector 1 receives a lens shift signal from the remote controller 50 under the lens shift condition is now explained.

Figure 9:
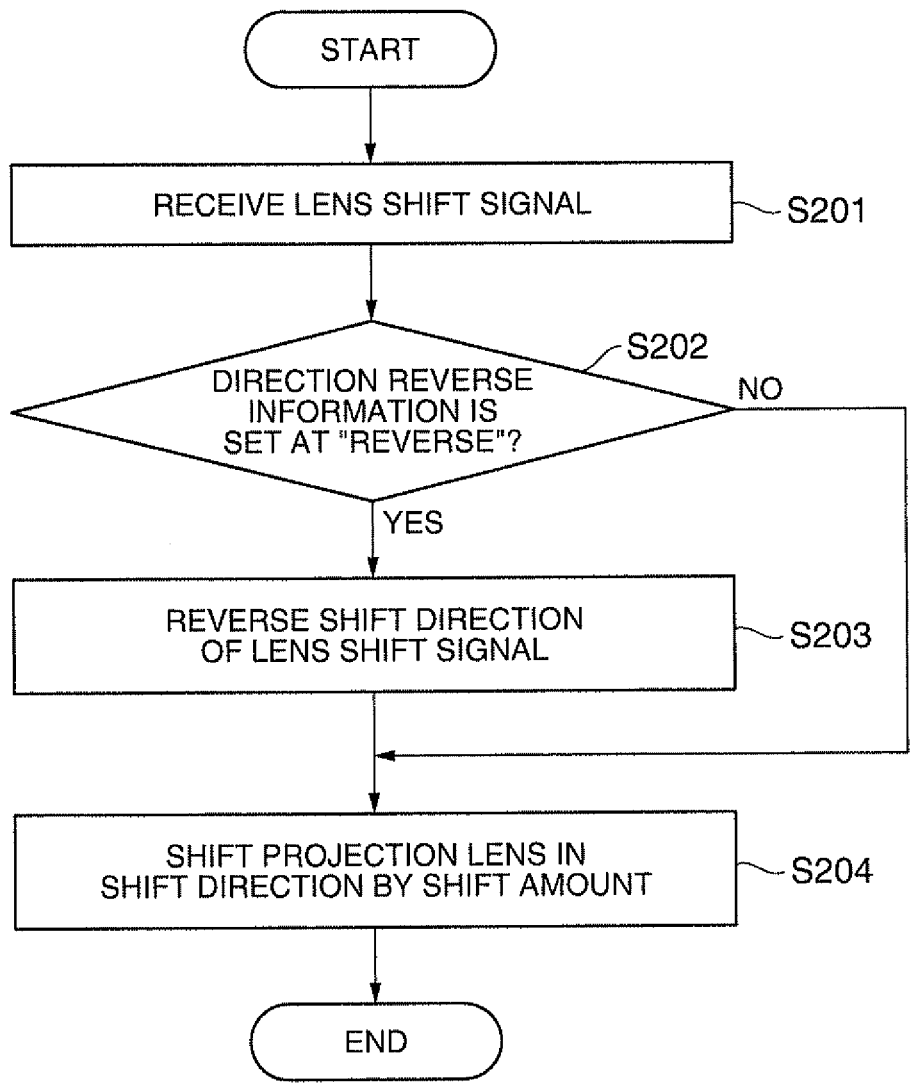
FIG. 9 is a flowchart showing the process performed when the projector receives a lens shift signal.

FIG. 9 is a flowchart showing the process executed when the projector 1 receives the lens shift signal.

When receiving the lens shift signal from the remote controller 50 (step S201), the control unit 20 determines whether the direction reverse information stored in the direction reverse memory unit 26 is set at "reverse" (step S202).

When the direction reverse information is set at "reverse" (step S202: YES), the control unit 20 reverses the shift direction of the lens shift signal (step S203). The control unit 20 in this step corresponds to a shift direction converting unit. Then, the control unit 20 issues an instruction associated with the shift direction and the shift amount to the lens shift control unit 27 to shift the projection lens 13 by the function of the lens shift mechanism 15 under the control of the lens shift control unit 27 (step S204). Then, the process performed when the projector 1 receives the lens shift signal ends.

When the direction reverse information is set at "non-reverse" (step S202: NO), the shift direction of the lens shift signal is not reversed. Then, the flow proceeds to the step S204, and the instruction associated with the shift direction and the shift amount is issued to the lens shift control unit 27 to shift the projection lens 13. After this step, the process performed when the projector 1 receives the lens shift signal ends.

Accordingly, when receiving the lens shift signal under the condition in which the direction reverse information is set at "reverse", the projector 1 reverses the direction of the lens shift of the projection lens 13.

According to the first embodiment, the following advantages can be offered.

(1) When receiving the lens shift start signal from the remote controller 50 under the condition in which the current installation mode is different from the previous installation mode, the projector main body 2 displays the remote control lens shift direction setting menu screen M2. That is, when the installation mode is changed, it is considered that the user has reversed the installation position of the projector main body 2. Thus, the projector main body 2 displays the remote control lens shift direction setting menu screen M2 which urges the user to change the direction of the lens shift. In this case, the remote control lens shift direction setting menu screen M2 can be displayed without requiring intention of display by the user, which improves the maneuverability. Moreover, the remote control lens shift direction setting menu screen M2 is displayed at the start of the lens shift even for a user who forgot to set the function of reversing the direction of the lens shift (that is, who forgot to change the direction reverse information), or a user who does not know this function itself. By this method, these users can set the function of reversing the direction of the lens shift, which improves the usability.

(2) According to the projector 1, the user can set the shift direction of the projection lens 13 through the remote control lens shift direction setting menu screen M2. Thus, disagreement between the direction of the lens shift signal received from the remote controller 50 and the shift direction of the projection lens 13 at the time of the lens shift can be avoided.

(3) When the current installation mode agrees with the previous installation mode at the time of reception of the lens shift start signal from the remote controller 50, the projector main body 2 does not display the remote control lens shift direction setting menu screen M2. That is, when the installation mode is not changed, the remote control lens shift direction setting menu screen M2 is not displayed. Thus, the user can easily perform the operation for lens shift.

Second Embodiment

A projector according to a second embodiment is now described.

A projector 100 in the second embodiment displays the remote control lens shift direction setting menu screen M2 based on the installation mode of the projector and the direction reverse information.

The system structure of the projector 100 in the external appearance according to the second embodiment is similar to the structure of the projector 1 in the first embodiment, and the same explanation of the structure is not repeated herein. In addition, the block diagram showing the general structure of the projector 100 according to the second embodiment is similar to the block diagram of the projector 1 in the first embodiment, and the same explanation of the block diagram is not repeated herein. According to the second embodiment, the previous installation mode memory unit 25 shown in the block diagram can be eliminated.

The operation of the projector 100 in the second embodiment is now explained. Initially, the process performed when the projector main body 2 receives the lens shift start signal from the remote controller 50 is discussed.

Figure 10:
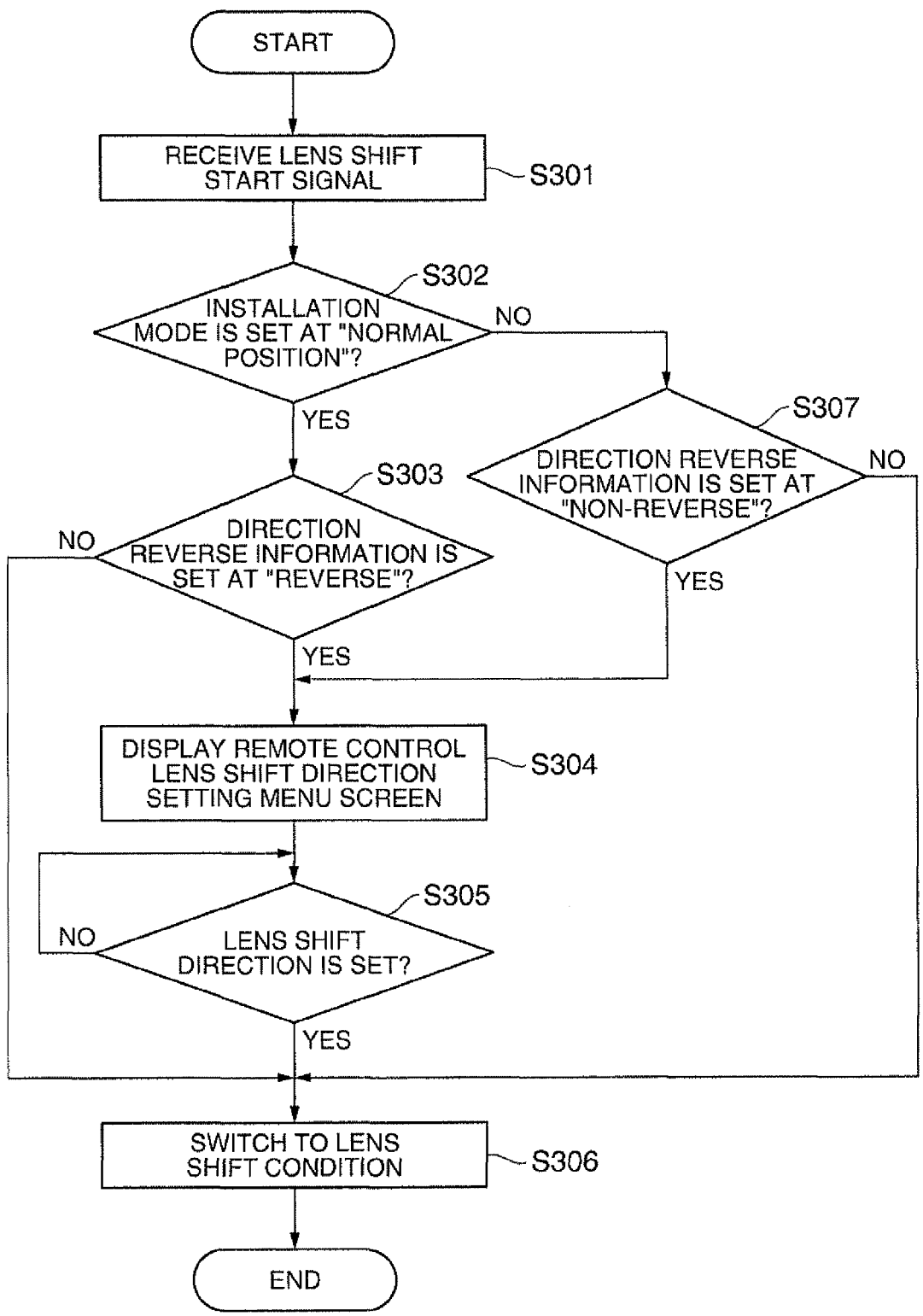
FIG. 10 is a flowchart showing the process performed when a projector in a second embodiment receives a lens shift start signal.

FIG. 10 is a flowchart showing the process performed when the projector 100 receives the lens shift start signal in the second embodiment.

When receiving the lens shift start signal from the remote controller 50 (step S301), the control unit 20 determines whether the installation mode stored in the installation mode memory unit 24 is set at "normal position" (step S302). When the installation mode is set at "normal position" (step S302: YES), the control unit 20 determines whether the direction reverse information stored in the direction reverse memory unit 26 is set at "reverse" (step S303).

When the direction reverse information is set at "reverse" (step S303: YES), the control unit 20 issues an instruction for displaying the remote control lens shift direction setting menu screen M2 to the OSD processing unit 32 (step S304). Then, the control unit 20 waits for the setting of the lens shift direction to be inputted by the user while displaying the remote control lens shift direction setting menu screen M2 (step S305). When the setting of the lens shift direction is completed, the control unit 20 stores the setting in the direction reverse memory unit 26 as the direction reverse information.

After the setting of the lens shift direction is finished (step S305: YES), the control unit 20 allows the projector 100 to come into the lens shift condition in which the projector 100 can receive the operation of the lens shift key 56 and shift the projection lens 13 (step S306). Then, the process performed when the projector 100 receives the lens shift start signal ends.

When the direction reverse information is not set at "reverse" (step S303: NO), the flow proceeds to the step S306 to allow the projector 100 to come into the lens shift condition. Then, the process performed when the projector 100 receives the lens shift start signal ends.

When the installation mode is not set at "normal position", that is, when the installation mode is at "suspended position" (step S302: NO), the control unit 20 determines whether the direction reverse information stored in the direction reverse memory unit 26 is set at "non-reverse" (step S307).

When the direction reverse information is set at "non-reverse" (step S307: YES), the flow proceeds to the step S304 to display the remote control lens shift direction setting menu screen M2 which urges the user to set the lens shift direction and switch to the lens shift condition. Then, the process performed when the projector 100 receives the lens shift start signal ends.

When the direction reverse information is not set at "non-reverse", that is, when the direction reverse information is at "reverse" (step S307: NO), the flow proceeds to the step S306 to switch to the lens shift condition. Then, the process performed when the projector 100 receives the lens shift start signal ends.

Accordingly, the projector 100 displays the remote control lens shift direction setting menu screen M2 when the installation mode is set at "normal position" with the direction reverse information set at "reverse", or when the installation mode is set at "suspended position" with the direction reverse information set at "non-reverse" to allow the user to change the direction reverse information of lens shift.

The process performed when the projector 100 receives the lens shift signal from the remote controller 50 under the lens shift condition is similar to that process performed by the projector 1 in the first embodiment, and the same explanation of the process is not repeated.

According to the second embodiment, the same advantage as the advantage (2) of the first embodiment can be offered. In addition, the following advantages can be provided.

(1) The projector main body 2 displays the remote control lens shift direction setting menu screen M2 when the installation mode is set at "normal position" with the direction reverse information set at "reverse", or when the installation mode is set at "suspended position" with the direction reverse information set at "non-reverse" at the time of reception of the lens shift start signal from the remote controller 50. That is, when it is considered that the direction of the lens shift is established in opposition to the installation condition of the projector main body 2, the projector main body 2 displays the remote control lens shift direction setting menu screen M2 which urges the user to change the direction of the lens shift. In this case, the remote control lens shift direction setting menu screen M2 can be displayed without requiring intention of display by the user, which improves the maneuverability. Moreover, the remote control lens shift direction setting menu screen M2 is displayed at the start of the lens shift even for a user who forgot to set the function of reversing the direction of the lens shift (that is, who forgot to change the direction reverse information), or a user who does not know this function itself. By this method, these users can set the function of reversing the direction of the lens shift, which improves the usability.

(2) The projector main body 2 does not display the remote control lens shift direction setting menu screen M2 when the installation mode is set at "normal position" with the direction reverse information set at "non-reverse", or when the installation mode is set at "suspended position" with the direction reverse information set at "reverse" at the time of reception of the lens shift start signal from the remote controller 50. That is, under these conditions, the remote control lens shift direction setting menu screen M2 is not displayed. Thus, the user can easily execute the operation of the lens shift.

The invention is not limited to the embodiments described herein but may be practiced with various changes, improvements and the like. For example, the following modifications may be made.

Modified Example 1

According to the respective embodiments, the projectors 1 and 100 perform projection on the reflection-type screen SC from the front (hereinafter referred to as "front projection"). However, the projectors 1 and 100 may perform projection on a transmission-type screen from the back (hereinafter referred to as "rear projection"). In this case, the installation mode memory unit 24 stores any of "front projection—normal position" condition, "front projection—suspended position" condition, "rear projection—normal position" condition, and "rear projection suspended position" condition as the installation mode of the projector main body 2.

In this structure, the projector 1 in the first embodiment may display the remote control lens shift direction setting menu screen M2 when the current installation mode is different from the previous installation mode. In addition, the projector 1 in the first embodiment may display the remote control lens shift direction setting menu screen M2 in either condition of the "front projection" and the "rear projection" when the "normal position" and the "suspended position" are switched to the other position. In this case, the frequency of display of the remote control lens shift direction setting menu screen M2 at the time of the lens shift start operation can be reduced.

Moreover, when the installation mode is the "front projection—normal position" condition or the "rear projection—normal position" condition with the direction reverse information set at "reverse", or when the installation mode is the "front projection—suspended position" condition or the "rear projection—suspended position" condition with the direction reverse information set at "non-reverse", the projector 100 in the second embodiment may display the remote control lens shift direction setting menu screen M2.

Modified Example 2

While the remote controller 50 has the lens shift start key 55 and the lens shift key 56 in the respective embodiments, the lens shift key 56 may have the function of the lens shift start key 55. In this case, a lens shift signal containing the information about the lens shift start is transmitted to the projector main body 2 in response to the press of the lens shift key 56 provided on the remote controller 50. The projector main body 2 executes the process to be performed when receiving the lens shift start signal, and further executes the process to be performed when receiving the lens shift signal in response to the received lens shift signal. According to this structure, the necessity of providing the lens shift start key 55 on the remote controller 50 is eliminated, which simplifies the structure of the remote controller 50. In this case, it is preferable that the lens shift key 56 does not have the function of the cursor key 54.

Modified Example 3

According to the respective embodiments, the remote controller 50 has the lens shift start key 55. However, the user may initiate the lens shift by using a menu screen for starting lens shift displayed by the function of the OSD processing unit 32 or the like provided on the projectors 1 and 100. In this case, the necessity of providing the lens shift start key 55 on the remote controller 50 is eliminated, which simplifies the structure of the remote controller 50.

Modified Example 4

When the control unit 20 issues an instruction for displaying the remote control lens shift direction setting menu screen M2, the OSD processing unit 32 may display the remote control lens shift direction setting menu screen M2 such that the direction reverse information according to the current installation mode is highlighted.

Modified Example 5

While the communication between the remote controller 50 and the projector main body 2 is provided by using infrared light communication in the respective embodiments, this communication may be achieved by using radio waves for radio communication.

Modified Example 6

While the transmission type liquid crystal light valve 12 is used as the light modulation device in the respective embodiments, the light modulation device may be a reflection type light modulation device such as a reflection type liquid crystal light valve. Alternatively, the light modulation device may be a micromirror array device which modulates light emitted from a light source by controlling the emission direction of received light for each micromirror as pixel.

What is claimed is:

1. A projector controllable by remote operation using a remote controller, comprising:
   a lens position control unit which controls a projection position of an image by shifting a projection lens;
   a signal receiving unit which receives a position control start signal for allowing the lens position control unit to start position control and a lens shift signal for specifying a shift direction and shifting the projection lens in the specified shift direction based on input from the remote controller, the shift direction being perpendicular to an axis of the projection lens;
   a direction conversion memory unit which stores direction conversion information corresponding to the lens shift signal received by the signal receiving unit as information for performing a predetermined conversion of the shift direction of the projection lens, the direction conversion information being based on user input of a normal position or a suspended position of the projector;
   a shift direction converting unit which converts the shift direction of the projection lens based on the direction conversion information stored in the direction conversion memory unit;
   a menu display unit which displays a direction conversion menu screen through which the direction conversion information is inputted; and
   a control unit which allows the menu display unit to display the direction conversion menu screen when a predetermined condition is satisfied at the time of reception of the position control start signal by the signal receiving unit.

2. The projector according to claim 1, wherein the direction conversion information stored in the direction conversion memory unit for performing the predetermined conversion is information indicating whether the shift direction of the projection lens is reversed or not.

3. The projector according to claim 1, further comprising:
   an installation position memory unit which stores either a normal position corresponding to a condition that the projector main body is placed in a predetermined standard position or a suspended position corresponding to a condition that the projector main body is placed upside down as installation position information of the projector main body,
   wherein the predetermined condition is a condition in which the current installation position information currently stored in the installation position memory unit is different from the previous installation position information stored in the installation position memory unit at the time of previous reception of the position control start signal.

4. The projector according to claim 2, further comprising:
   an installation position memory unit which stores either a normal position corresponding to a condition that the projector main body is placed in a predetermined standard position or a suspended position corresponding to a condition that the projector main body is placed upside down as installation position information of the projector main body,
   wherein the predetermined condition corresponds to a setting in which the installation position information stored in the installation position memory unit is set at the normal position with the direction conversion information of the direction conversion memory unit set at reverse, or a setting in which the installation position information stored in the installation position memory unit is set at the suspended position with the direction conversion information of the direction conversion memory unit set at non-reverse.

5. The projector according to claim 1, wherein the lens shift signal includes the position control start signal.

6. The projector according to claim 1, wherein the direction conversion menu screen includes the direction reverse information which is highlighted according to the current installation mode.

7. A control method of a projector that is controllable by remote operation using a remote controller and includes a lens position control unit which controls a projection position of an image by shifting a projection lens, a signal receiving unit which receives a position control start signal for allowing the lens position control unit to start position control from the remote controller, and a lens shift signal for specifying a shift direction and shifting the projection lens in the specified shift direction based on input from the remote controller, the shift direction being perpendicular to an axis of the projection lens, a direction conversion memory unit which stores direction conversion information corresponding to the lens shift signal received by the signal receiving unit as information for performing a predetermined conversion of the shift direction of the projection lens, a shift direction converting unit which converts the shift direction of the projection lens based on the direction conversion information stored in the direction conversion memory unit, and a menu display unit which displays a direction conversion menu screen through which the direction conversion information is inputted, the method comprising:
   allowing the signal receiving unit to receive the position control start signal from the remote controller;
   determining whether a predetermined condition is satisfied when the position control start signal is received; and
   allowing the menu display unit to display the direction conversion menu screen when it is determined that the predetermined condition is satisfied, and receiving user input of a normal position or a suspended position of the projector.

8. The control method according to claim 7, wherein the direction conversion information stored in the direction conversion memory unit for performing the predetermined conversion is information indicating whether the shift direction of the projection lens is reversed or not.

9. The control method according to claim 7, the projector further including an installation position memory unit which stores either a normal position corresponding to a condition that the projector main body is placed in a predetermined standard position or a suspended position corresponding to a condition that the projector main body is placed upside down as installation position information of the projector main body, wherein the predetermined condition is a condition in which the current installation position information currently stored in the installation position memory unit is different from the previous installation position information stored in the installation position memory unit at the time of previous reception of the position control start signal.

10. The control method according to claim 8, the projector further including an installation position memory unit which stores either a normal position corresponding to a condition that the projector main body is placed in a predetermined standard position or a suspended position corresponding to a condition that the projector main body is placed upside down as installation position information of the projector main body, wherein the predetermined condition corresponds to a setting in which the installation position information stored in the installation position memory unit is set at the normal position with the direction conversion information of the direction conversion memory unit set at reverse, or a setting in which the installation position information stored in the installation position memory unit is set at the suspended position with the direction conversion information of the direction conversion memory unit set at non-reverse.

11. The control method according to claim 7, wherein the lens shift signal includes the position control start signal.

12. The control method according to claim 7, wherein the direction conversion menu screen includes the direction reverse information which is highlighted according to the current installation mode.

* * * * *